No. 739,567. PATENTED SEPT. 22, 1903.
G. WHITE.
ROTARY ENGINE.
APPLICATION FILED SEPT. 26, 1901.
NO MODEL. 3 SHEETS—SHEET 1.
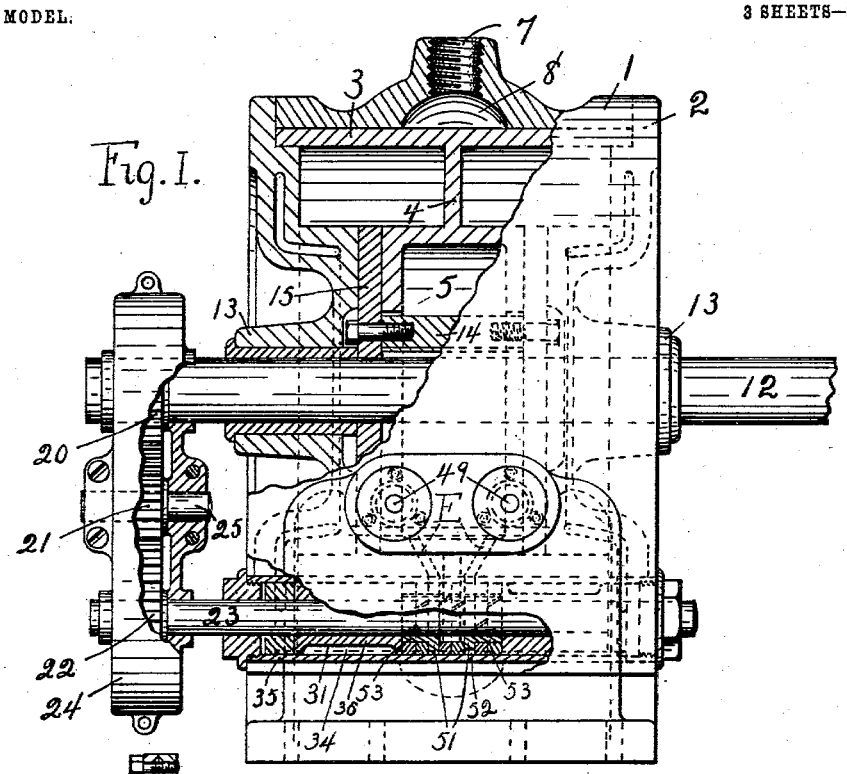
Fig. I.
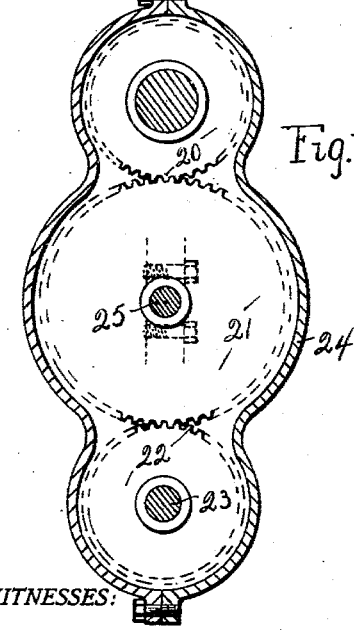
Fig. VIII.
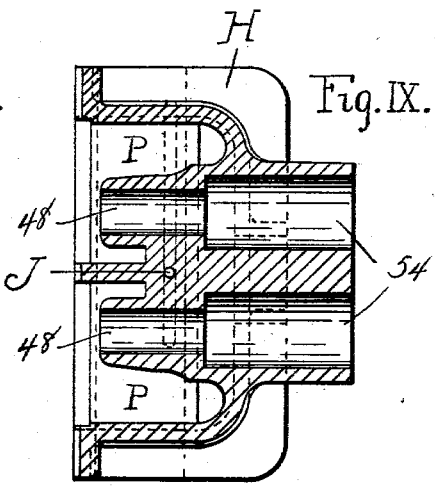
Fig. IX.
WITNESSES:
C. C. Schörneck
E. L. Darling.
INVENTOR
George White
BY Alfred Wilkinson
ATTORNEY.

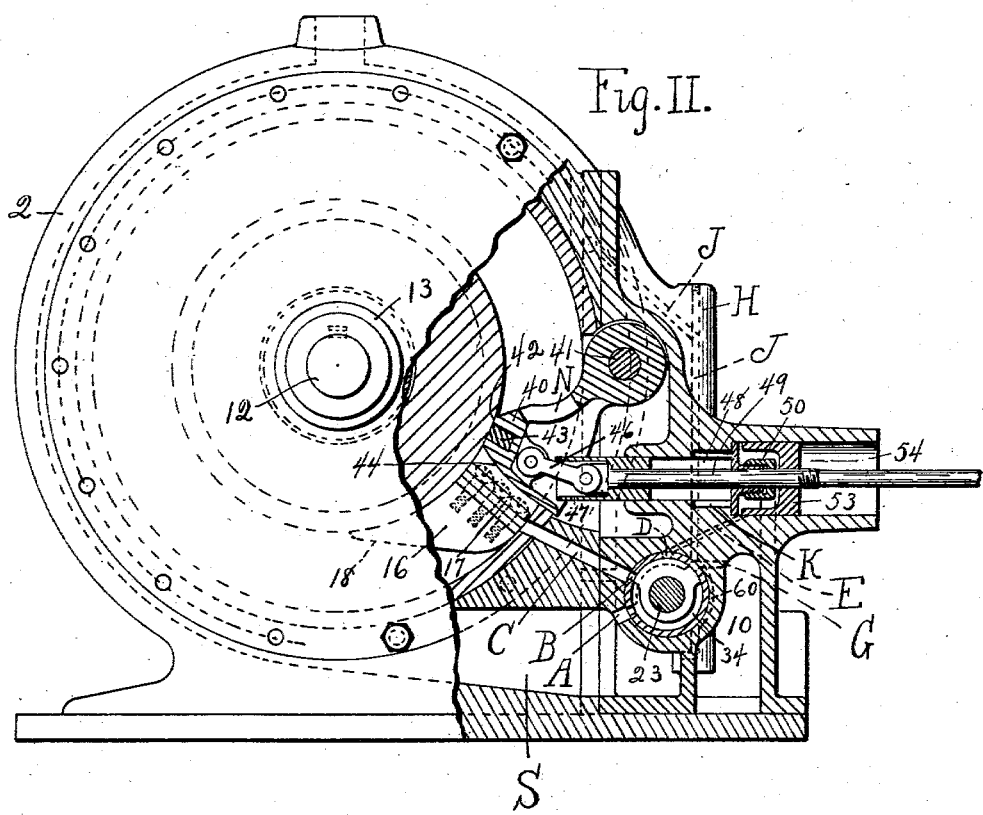
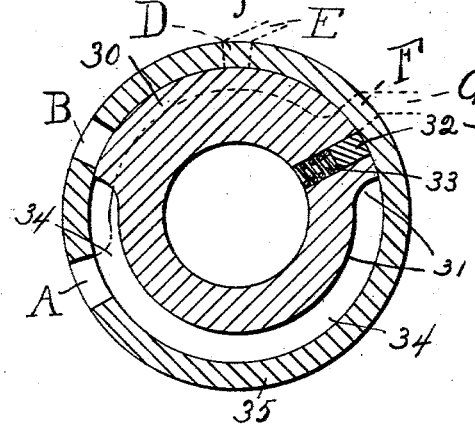
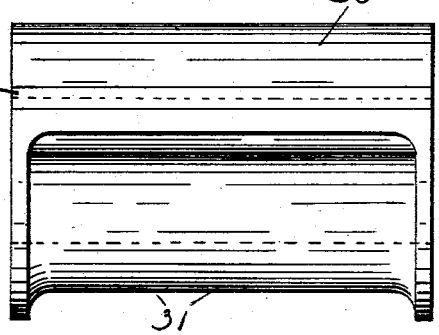

No. 739,567. PATENTED SEPT. 22, 1903.
G. WHITE.
ROTARY ENGINE.
APPLICATION FILED SEPT. 26, 1901.
NO MODEL. 3 SHEETS—SHEET 3.
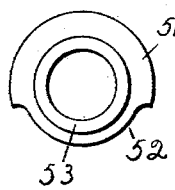
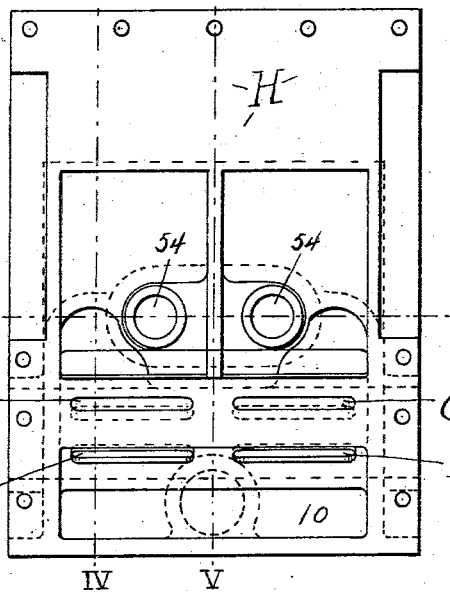
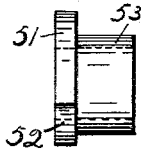
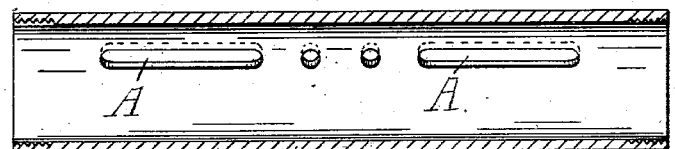
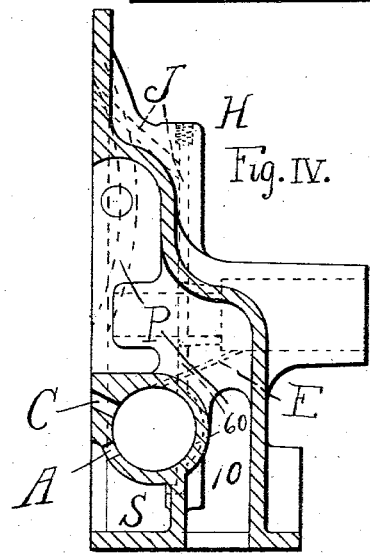
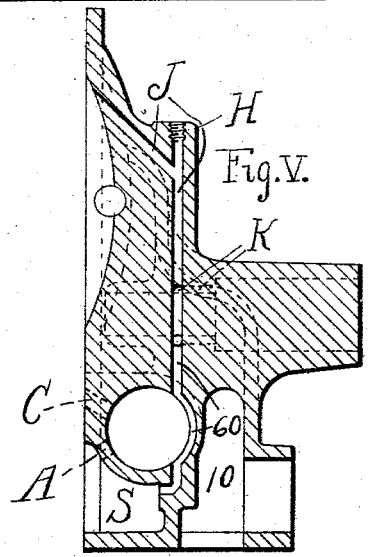
WITNESSES:
INVENTOR
George White
BY
Alfred Wilkinson
ATTORNEY.

No. 739,567.  
Patented September 22, 1903.

UNITED STATES PATENT OFFICE.

GEORGE WHITE, OF JERSEY CITY, NEW JERSEY, ASSIGNOR, BY MESNE ASSIGNMENTS, TO BUSH ENGINE COMPANY, A CORPORATION OF NEW JERSEY.

ROTARY ENGINE.

SPECIFICATION forming part of Letters Patent No. 739,567, dated September 22, 1903.

Application filed September 26, 1901. Serial No. 76,620. (No model.)

*To all whom it may concern:*

Be it known that I, GEORGE WHITE, of Jersey City, in the county of Hudson, in the State of New Jersey, have invented new and useful Improvements in Rotary Engines, of which the following, taken in connection with the accompanying drawings, is a full, clear, and exact description.

My invention relates to a rotary engine of new construction; and it consists in an outer shell forming the cylinder, a rotary piston concentrically arranged therein on the crank-shaft, and a swinging gate to cut off the steam normally held closed by the action of the steam, but periodically swung open to permit the rotating piston to pass. A steam-channel surrounds the cylinder, and a rotating valve is arranged to admit the steam from said channel to the cylinder between the gate and piston at the proper time. Said valve is operated from the shaft by a chain of gears or other suitable mechanism.

My invention will be understood by reference to the drawings herewith, in which the reference letters and numerals of the specification indicate the same parts in all the figures.

Figure I is a side elevation, parts being broken away and parts shown in section. Fig. II is a similar view at right angles to Fig. I. Fig. III is a side elevation of the extension in which are the gate-cylinders and bearing for the gate. Fig. IV is a vertical cross-section on section-line IV of Fig. III. Fig. V is a corresponding section on section-line V of Fig. III. Fig. VI is an enlarged cross-section of the cut-off valve and casing. Fig. VII is a side elevation of the cut-off valve. Fig. VIII is a side elevation of the gears connecting the shaft to the valve-shaft. Fig. IX is a horizontal cross-section of the extension on section-line IX of Fig. III. Fig. X is a longitudinal section of the steam-inlet-chamber casing. Figs. XI and XII are respectively front and side elevation of gate-cylinder valve.

I have shown a double engine made according to my invention with two cylinders, pistons, gates, and valves, with a common steam-channel and exhaust and a single mechanism for operating both cut-off valves and gate-cylinder valves from the main or crank shaft.

In the figures, 1 indicates the cylinder-casing; 2, the side plates; 3, the cylinder-casing, having septum 4 and center 5.

7 is the steam-inlet, and 8 the steam-channel extending around the cylinder and communicating with the common exhaust-chamber 10.

12 is the shaft fitting the bearings 13, carrying the piston-hub 14, to which are secured both piston-plates 15, on which are respective pistons 16, formed with packing-plate 17, and inclined rear face 28. On the shaft is keyed the gear 20, meshing with intermediate gear 21, which in turn meshes with gear 22 on the valve-shaft 23. This chain of gears is inclosed and protected by the shell 24, in which is journaled pin 25 for the intermediate gear. On valve-shaft 23 are secured the two steam-inlet valves 30, cut away at 31 to form an elongated steam-channel from steam-channel port A through port B and duct C to the cylinder between the gate and the piston. The valve is preferably provided with a steam-tight packing 32 and spring 33. Each valve is fitted to a steam-valve chamber 34, having casing 35.

The gate 40, journaled on pin 41 in extension H, in which are also arranged the steam-valves and the gate cylinders and pistons, is preferably formed with a face 42, provided with steam-packing 43 to fit the inner surface of the cylinder, and with a face 44, formed in the arc on the pin 41 as a center to fit the cylinder-shell steam-tight.

By link 46 the gate is connected to the smaller gate-piston 47, fitting the smaller gate-cylinder 48 and carried on piston-rod 49, 50 being the steam-tight packing-box. On this rod is also secured the larger gate-piston 53, fitting the larger gate-cylinder 54.

From the steam-channel the steam is admitted through duct J to annular space K around the smaller gate-cylinder, tending to continually retain the gate in closed position; but periodically from steam-channel through port A steam is admitted to valve-chamber 34 and thence through port D and duct E to larger gate-cylinder 54, having a larger steam-surface than the small gate-cylinder, by which pressure in smaller gate-cylinder is overcome and the gate swung open at the proper time to permit the passage of the piston.

Ports D are normally closed (but periodically open at proper time, permitting steam to enter larger cylinder 54) by valves 51, (shown detached in Figs. XI and XII,) formed with cut-away portion 52 to connect with inlet-duct E and exhaust-duct G and with hub 53 for the packing-rings. After space 52 has passed port A the steam is cut off, and as gate-valve 51 turns space 52 connects duct E and port D with exhaust-port F and duct G to chamber 10 for exhaust from large gate-cylinder 54.

60 is a circulation-duct extending from annular space K around the valve-chamber to enlarged end S of steam-channel 8 to insure circulation of dry steam and a continuous pressure in the smaller gate-cylinder to keep the gate closed during the time the steam is cut off from the larger gate-cylinder 54.

N is an exhaust-port through the gate, communicating by ducts P P with the common exhaust-chamber 10.

In my invention one or more cylinders and sets of operating parts may be arranged in a single shell having a common exhaust and a single set of connections for operating the steam-valves. The steam is admitted and strikes a certain area of piston which remains constant, therefore getting all the expansion and the advantage of admitting the steam and cutting it off at any point of the stroke.

In my engine the exhaust is always open through the exhaust-port in the gate and there can be no back pressure. The exhaust is constant and free at all times, and the ports may be of the full size of the cylinder instead of limited size. The valve is arranged to admit and cut off the steam sharply and independently of the piston. There is a steam-pressure tending always to keep the gate closed; but intermittingly and at the proper time the steam is admitted to the larger gate-cylinder and into contact with the larger surface, whereby the steam-pressure tending to close the gate is overcome and the valve is opened, permitting the piston to pass.

Having thus described my invention, what I claim, and desire to secure by Letters Patent, is—

1. In a rotary engine, the combination with an outer shell or main case formed with steam-inlets and a central, circular cylinder, and with larger and smaller gate-cylinders, of a rotating piston arranged concentrically in the cylinder, a swinging gate fitting the cylinder to cut off the steam, said gate being normally held closed by steam-pressure, but periodically swung open, of a piston-rod connected to the gate, of larger and smaller gate-pistons on the piston-rod fitted respectively to the larger and smaller gate-cylinders, and of means to admit steam to the smaller gate-cylinder and periodically to admit steam to the larger gate-cylinder.

2. In a rotary engine, the combination with an outer shell or main case formed with steam-inlets and a central, circular cylinder, and with larger and smaller gate-cylinders, of a rotating piston arranged concentrically in the cylinder, a swinging gate fitting the cylinder to cut off the steam, said gate being normally held closed by steam-pressure, but periodically swung open, of a piston-rod connected to the gate to operate the gate, of larger and smaller gate-pistons on the piston-rod fitted respectively to the larger and smaller gate-cylinders, of means to admit steam to the smaller gate-cylinder, and of rotating valves fitted to a suitable valve-chamber adapted, one alternately to admit and cut off steam from the main cylinder, one alternately to admit and cut off steam from the larger gate-cylinder.

3. In a rotary engine, the combination with an outer shell or main case formed with a central, circular cylinder, a steam-channel around the cylinder, larger and smaller gate-cylinders, the latter connected to the steam-channel, and a valve-chamber connected to the steam-channel, to the cylinder, to the larger gate-cylinder and to the exhaust, of a rotating piston arranged concentrically in the cylinder, a swinging gate fitting the cylinder to cut off the steam, said gate being normally held closed by steam-pressure, but periodically swung open, of a piston-rod connected to the gate, of larger and smaller gate-pistons on the piston-rod fitted respectively to the larger and smaller gate-cylinders, of rotating valves fitted to a suitable valve-chamber adapted, one alternately to admit and cut off steam from the main cylinder, and one alternately to admit steam to the larger gate-cylinder and to permit the exhaust of steam therefrom.

4. In a rotary engine, the combination with the case or outer shell formed with a central, circular cylinder, with larger and smaller gate-cylinders, a steam-channel around the cylinder, the smaller gate-cylinder connected to the steam-channel, and a valve-chamber also connected to the steam-channel, to the cylinder, to the larger gate-cylinder and to the exhaust, a crank-shaft, of a rotating piston on the crank-shaft concentrically arranged in the valve-chambers, a valve-shaft concentrically arranged in the valve-chamber, an elongated steam-inlet valve having a cut-away portion arranged on the valve-shaft, a shorter gate-valve having a cut-away portion arranged on the valve-shaft, connections between the crank-shaft and the valve-shaft to rotate the valve-shaft and valves, a swinging gate fitting the cylinder to cut off the steam, normally held closed by constant steam-pressure, and periodically swung open by a greater steam-pressure, a piston-rod arranged concentrically in the larger and smaller gate-cylinders, a smaller gate-piston on the piston-rod fitted to the smaller gate-cylinder, a link connecting the gate to the smaller gate-piston, and a larger gate-piston on the piston-rod fitted to the larger gate-cylinder.

5. In a rotary engine, the combination with the shell formed with a circular cylinder, adjacent, larger and smaller gate-cylinders arranged at right angles to the main cylinder, a valve-chamber, an exhaust-chamber, a steam-channel extending around the cylinder outside of the casing, a port from the steam-channel to the valve-chamber, a duct from the valve-chamber to the cylinder, a duct from the larger gate-cylinder, and a gate-cylinder exhaust-duct connecting the valve-chamber to the exhaust-chamber, a piston on a crank-shaft concentrically arranged in the cylinder, a valve-shaft concentrically arranged in the valve-chamber, a steam-inlet valve having a cut-away portion arranged on the valve-shaft, a gate-valve having a cut-away portion arranged on the valve-shaft, connections between the crank-shaft and the valve-shaft to rotate the valve-shaft and valves, a swinging gate fitting the cylinder to cut off the steam normally held closed by steam-pressure and periodically swung open by steam-pressure, a piston-rod arranged concentrically in the larger and smaller gate-cylinders, a smaller gate-piston on the piston-rod fitted to the smaller gate-cylinder, a link connecting the gate to the smaller gate-piston, a larger gate-piston on the piston-rod fitted to the larger gate-cylinder.

6. In a rotary engine, the combination with the shell formed with a central, circular cylinder, with larger and smaller gate-cylinders formed continuously and at right angles to the main cylinder, a valve-chamber arranged parallel to the main cylinder, an exhaust-chamber, a steam-channel extending around the cylinder outside of the casing communicating with the smaller gate-cylinder, a port from the steam-channel to the valve-chamber, a duct from the valve-chamber to the cylinder, a duct from the valve-chamber to the larger gate-cylinder, and a gate-cylinder exhaust-duct connecting the valve-chamber with the common exhaust-chamber, of a crank-shaft, a piston on the crank-shaft concentrically arranged in the cylinder, a valve-shaft concentrically arranged in the valve-chamber, an elongated steam-inlet valve having a cut-away portion on the valve-shaft and arranged to control the supply of steam to the cylinder, a shorter gate-valve having a cut-away portion arranged to control the supply of steam to the larger gate-cylinder, connections between the crank-shaft and the valve-shaft to rotate the valve-shaft and valves, a swinging gate formed with an exhaust-port, fitting the cylinder to cut off the steam normally held closed by steam-pressure and periodically swung open by steam-pressure, a piston-rod arranged concentrically in the larger and smaller gate-cylinders, a smaller gate-piston on the piston-rod fitted to the smaller gate-cylinder, a link connecting the gate to the smaller gate-piston, and a larger gate-piston on the piston-rod fitted to the larger gate-cylinder.

7. In a rotary engine, the combination with the shell formed with a pair of circular cylinders, a larger and a smaller gate-cylinder for each main cylinder and arranged at right angles thereto, a valve-chamber arranged parallel to the main cylinders, a common exhaust-chamber, a steam-channel extending around the cylinder outside of the casing and communicating with the smaller gate-cylinders, ports from the steam-channel to the valve-chamber, ducts from the valve-chamber to the larger gate-cylinders, and gate-cylinder exhaust-ducts connecting the valve-chamber with the common exhaust-chamber; of a single crank-shaft, pistons on the crank-shaft concentrically arranged in the main cylinders respectively, a valve-shaft concentrically arranged in the valve-chamber, a pair of elongated steam-inlet valves having cut-away portions arranged on the valve-shaft, a pair of shorter gate-valves having cut-away portions arranged on the valve-shaft, connections between the crank-shaft and the valve-shaft to rotate the valve-shaft and valves, swing-gates fitting the respective cylinders to cut off the steam, normally held closed by steam-pressure, and periodically swung open by steam-pressure, piston-rods arranged concentrically in the respective pairs of larger and smaller gate-cylinders, smaller gate-pistons on the piston-rods fitted to the smaller gate-cylinders, links connecting the gates to the smaller gate-pistons, and larger gate-pistons on the piston-rods fitted to the larger gate-cylinders.

8. In a rotary engine, the combination with the shell formed with a circular cylinder, larger and smaller gate-cylinders formed continuously and arranged at right angles to the main cylinder, a valve-chamber arranged parallel to the main cylinder, an exhaust-chamber, a steam-channel extending around the cylinder outside of the casing and communicating with the smaller gate-cylinder, a port from the steam-channel to the valve-chamber, a duct from the valve-chamber to the cylinder, a duct from the valve-chamber to the larger gate-cylinder, and a gate-cylinder exhaust-duct connecting the steam-inlet chamber or valve-chamber with the common exhaust-chamber, of a casing to the cylinder, a crank-shaft concentrically arranged in the shell, a rotating piston on the crank-shaft concentrically arranged in the cylinder, a valve-shaft concentrically arranged in the valve-chamber gears on the valve-shaft and crank-shaft, an intermediate gear and support therefor meshing with said gears, a shell inclosing said chain of gears; a shell fitted to the valve-chamber formed with suitable ports corresponding with the steam inlet and outlet ducts to the valve-chamber, an elongated steam-inlet valve arranged on the valve-shaft and fitting within the valve-chamber casing, a shorter gate-valve arranged on the valve-shaft and fitting within the valve-chamber casing; a swinging gate fitting the main cylinder and formed with an exhaust-port communicating by a duct formed in the main shell with the exhaust-chamber, a piston-rod arranged concentrically in the gate-cylinders, a smaller gate-piston secured on the piston-rod and fitting the smaller gate-cylinder, a link pivotally secured to the smaller gate-piston and to the swinging gate, and a larger gate-piston secured on the piston-rod and fitting the larger gate-cylinder, a steam-tight partition between the gate-cylinders.

9. In a rotary engine, the combination of a main case suitably supported forming the cylinder, a shaft concentrically journaled therein, a piston on a shaft, a swinging gate fitting the cylinder to cut off the steam, means to apply a constant steam-pressure to the gate tending to hold it in closed position, means periodically to apply a greater steam-pressure to the gate, to open the gate and permit the cylinder to pass, and means to admit steam to the cylinder.

10. In a rotary engine, the combination of a fixed shell suitably supported formed with a cylinder, a shaft concentrically journaled therein, a piston on the shaft arranged to rotate in the cylinder, a swinging gate fitting the cylinder to cut off the steam, said gate being on a pin at one of its ends outside of the cylinder, means to apply constant steam-pressure to the gate tending to hold it in closed position, means periodically to apply a greater steam-pressure thereto to open the gate and permit the piston to pass, and means to admit steam to the cylinder.

11. In a rotary engine, the combination of a shell suitably supported forming a fixed cylinder, a shaft concentrically journaled in the shell, a piston-hub on the shaft, a cylinder-casing forming a steam-channel of uniform width, a piston on the piston-hub fitting the periphery of the cylinder, a swinging gate hung on a pin at one of its ends outside of the cylinder to cut off the steam, means to apply a constant steam-pressure to the gate tending to hold it in closed position, means periodically to apply a greater steam-pressure to the gate to open the gate and permit the cylinder to pass, and means to admit steam to the cylinder.

12. In a rotary engine, the combination with a fixed case formed with steam-inlets and a central, circular cylinder, of a rotating piston arranged concentrically in the cylinder, a swinging gate fitting the cylinder to cut off the steam, of smaller and larger gate-pistons connected to the gate and fitted respectively to smaller and larger gate-cylinders, of means to admit steam to the smaller gate-cylinder, and of means periodically to admit steam to the larger gate-cylinder.

13. In a rotary engine, the combination of a fixed shell suitably supported forming the cylinder, a shaft suitably journaled in the shell, a piston on the shaft, a gate fitting the cylinder to cut off the steam, means normally holding the gate in closed position, and means periodically to open the gate to permit the cylinder to pass, said gate being formed with a suitable channel permitting the engine to exhaust through the gate.

14. In a rotary engine, the combination of a shell suitably supported, a cylinder-casing fitted thereto forming a corresponding pair of cylinders, a shaft suitably journaled in the shell, pistons on the shaft fitted to the cylinders, gates fitted to the cylinders to cut off the steam, means for normally holding the gates in closed position, means periodically swinging the gates open to permit the pistons to pass, and means for admitting steam to the cylinders, said gates being formed with exhaust-ports communicating by ducts formed in the casing with a common exhaust-chamber also formed in the casing and having an external opening.

15. In a rotary engine, the combination with a case formed with an interior cylinder, of a shaft concentrically journaled therein, a piston on the shaft fitting the cylinder, a gate fitting the cylinder to cut off the steam, means to apply a constant steam-pressure to the gate tending to maintain it closed, means periodically applying a greater opposed steam-pressure thereto to open the gate permitting the piston to pass, rotating valves fitted to a suitable valve-chamber and operated one alternately to admit and cut off steam from the cylinder, and the other to admit and cut off steam from the means applying the greater steam-pressure by which the gate is opened.

16. In a rotary engine, the combination with the case formed with a cylinder, a valve-chamber arranged axially parallel to the cylinder and connecting-channels between the cylinder and the valve-chamber, of a shaft concentrically journaled in the case, a piston on the shaft fitting the cylinder, a gate fitting the cylinder to cut off the steam, means to apply a constant steam-pressure to the gate tending to maintain it closed, means periodically applying a greater opposed steam-pressure thereto to open the gate and permit the piston to pass, and rotating valves fitted to the valve-chamber operated, one to admit and cut off the steam from the cylinder and the other to admit and cut off the steam from the means applying the greater steam-pressure to the gate.

17. In a rotary engine, the combination with a main case formed with the cylinder, of a separate extension on the case formed with a valve-chamber arranged axially parallel to the cylinder, said case and extension being formed with channels connecting the valve-chamber to the cylinder and being also formed with smaller and larger gate-cylinders, of larger and smaller valves fitted to the valve-chamber, the larger being operated to admit and cut off steam from the cylinder, and the smaller to admit and cut off steam from the larger gate-cylinder, of a shaft concentrically journaled in the case, a piston on the shaft fitted to the cylinder, a swinging gate fitted to the cylinder, a smaller gate-piston fitted to the smaller gate-cylinder and connected to the gate to maintain it in closed position, and a larger gate-piston fitted to the larger gate-cylinder and connected to the gate periodically to open the gate permitting the piston to pass.

18. In a rotary engine, the combination with a fixed shell forming the cylinder, a shaft suitably journaled in the shell, a piston on the shaft arranged concentrically in the cylinder, a gate fitting the cylinder and engaging with the piston to cut off the steam, gate-pistons of different sizes connected by a single connection to the gate and means to admit steam to the two gate-pistons.

19. In a rotary engine, the combination with a fixed shell formed with steam-inlets and an interior chamber forming the cylinder, of a rotating piston arranged concentrically in the cylinder, a swinging gate fitted to the cylinder to cut off the steam, of smaller and larger gate-pistons connected to the gate by a single connection, of means to apply steam-pressure to the smaller gate-piston and of means to apply steam-pressure periodically to the larger gate-piston.

20. In a rotary engine, the combination with a fixed case formed with steam-inlets and a central circular chamber, of a rotating piston arranged concentrically in the cylinder, a swinging gate fitting the cylinder to cut off the steam, of a reciprocating piston-rod, a connection between the piston-rod and the gate, smaller and larger gate-pistons on the rod fitted respectively to smaller and larger gate-cylinders, of means to admit steam to the smaller gate-cylinder and of means periodically to admit steam to the larger gate-cylinder.

In testimony whereof I have hereunto signed my name.

GEORGE WHITE. [L. S.]

Witnesses:
ALFRED WILKINSON,
C. C. SCHOENECK.